(12) United States Patent
Blaise et al.

(10) Patent No.: US 12,377,628 B2
(45) Date of Patent: *Aug. 5, 2025

(54) DEVICE FOR SHAPING A FIBROUS PREFORM FOR PRODUCING A BLADED PART OF A TURBOMACHINE

(71) Applicant: SAFRAN AIRCRAFT ENGINES, Paris (FR)

(72) Inventors: Maxime Marie Desire Blaise, Moissy-Cramayel (FR); Hubert Jean Marie Fabre, Moissy-Cramayel (FR); Jeff Pote, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/557,003

(22) PCT Filed: Apr. 22, 2022

(86) PCT No.: PCT/FR2022/050766
§ 371 (c)(1),
(2) Date: Oct. 24, 2023

(87) PCT Pub. No.: WO2022/229548
PCT Pub. Date: Nov. 3, 2022

(65) Prior Publication Data
US 2024/0059039 A1    Feb. 22, 2024

(30) Foreign Application Priority Data
Dec. 16, 2021 (FR) .................................. 2113617

(51) Int. Cl.
*B29C 33/48* (2006.01)
*B29C 70/46* (2006.01)
(Continued)

(52) U.S. Cl.
CPC .... *B29D 99/0025* (2013.01); *B29K 2105/089* (2013.01); *B29K 2307/04* (2013.01)

(58) Field of Classification Search
CPC ... B29C 33/301; B29C 33/302; B29C 33/202; B29C 70/461; B29C 33/48
See application file for complete search history.

(56) References Cited

U.S. PATENT DOCUMENTS 2,664,593 A * 1/1954 Larson ............... B29D 99/0028
425/398
3,138,506 A * 6/1964 Ross .................. B29D 99/0028
428/116
(Continued)

FOREIGN PATENT DOCUMENTS

FR    2940057 A1    6/2010
FR    2943942 A1    10/2010
(Continued)

OTHER PUBLICATIONS

International Search Report received for PCT Patent Application No. PCT/FR2022/050766, mailed on Oct. 14, 2022, 7 pages (2 pages of English Translation and 5 pages of Original Document).

*Primary Examiner* — Matthew J Daniels
(74) *Attorney, Agent, or Firm* — WOMBLE BOND DICKINSON (US) LLP

(57) ABSTRACT

A device for shaping at least one fibrous preform of a bladed part of a turbine engine, the device including a mould formed of multiple parts nested inside one another, the mould defining an internal cavity for enclosing the preform entirely, the cavity having two platform zones and a blade zone extending between the two platform zones, wherein the mould includes at least a lower shell, an upper shell, a side (Continued)

shell, and end shells, and in that each of the side and end shells includes three elements, respectively lower, intermediate and upper.

14 Claims, 12 Drawing Sheets

(51) Int. Cl.
    *B29D 99/00*     (2010.01)
    *B29K 105/08*     (2006.01)
    *B29K 307/04*     (2006.01)

(56) References Cited

U.S. PATENT DOCUMENTS

| | | | | |
|---|---|---|---|---|
| 3,623,204 | A * | 11/1971 | Wagle | B23K 20/00 |
| | | | | 228/262.5 |
| 3,902,944 | A * | 9/1975 | Ashton | B29C 53/824 |
| | | | | 416/241 A |
| 4,720,244 | A * | 1/1988 | Kluppel | B29C 70/025 |
| | | | | 416/241 A |
| 5,547,629 | A * | 8/1996 | Diesen | B29C 70/086 |
| | | | | 264/258 |
| 5,885,504 | A * | 3/1999 | David | B29C 37/005 |
| | | | | 264/327 |
| 8,951,034 | B2 | 2/2015 | Christiansen et al. | |
| 8,951,457 | B2 * | 2/2015 | Galdeano | B29C 33/307 |
| | | | | 264/219 |
| 9,512,730 | B2 | 12/2016 | Mathon et al. | |
| 10,180,070 | B2 | 1/2019 | Chauvin et al. | |
| 11,091,245 | B2 * | 8/2021 | Lage | B64C 3/20 |
| 12,179,446 | B2 * | 12/2024 | Blaise | B29C 70/48 |
| 2010/0230859 | A1 * | 9/2010 | Sanderson | B29C 70/30 |
| | | | | 264/294 |
| 2011/0100542 | A1 * | 5/2011 | Faulkner | B29C 66/636 |
| | | | | 425/470 |
| 2011/0254185 | A1 | 10/2011 | Liew et al. | |
| 2012/0055609 | A1 | 3/2012 | Blanchard et al. | |
| 2014/0287084 | A1 * | 9/2014 | Petersen | B29C 33/0011 |
| | | | | 425/451.9 |
| 2014/0338815 | A1 | 11/2014 | Davis et al. | |
| 2016/0167269 | A1 * | 6/2016 | Pautard | B29C 45/14008 |
| | | | | 264/259 |
| 2016/0243777 | A1 | 8/2016 | Marchal et al. | |
| 2016/0297153 | A1 | 10/2016 | Henrio et al. | |
| 2017/0058863 | A1 | 3/2017 | Yarbrough et al. | |
| 2018/0147797 | A1 * | 5/2018 | Chassignet | B29C 70/543 |
| 2019/0322004 | A1 * | 10/2019 | White | B28B 7/0097 |
| 2021/0078217 | A1 * | 3/2021 | Okabe | B29C 70/446 |
| 2021/0323250 | A1 | 10/2021 | Ravey et al. | |
| 2022/0118657 | A1 | 4/2022 | Fyb et al. | |
| 2022/0347945 | A1 * | 11/2022 | Blaise | B29C 70/541 |

FOREIGN PATENT DOCUMENTS

| | | |
|---|---|---|
| FR | 3014008 A1 | 6/2015 |
| FR | 3022829 A1 | 1/2016 |
| FR | 3029134 A1 | 6/2016 |
| FR | 3032147 A1 | 8/2016 |
| FR | 3046404 A1 | 7/2017 |
| FR | 3051348 A1 | 11/2017 |
| FR | 3085131 A1 | 2/2020 |
| WO | 2014/076348 A1 | 5/2014 |

* cited by examiner

[Fig.1]
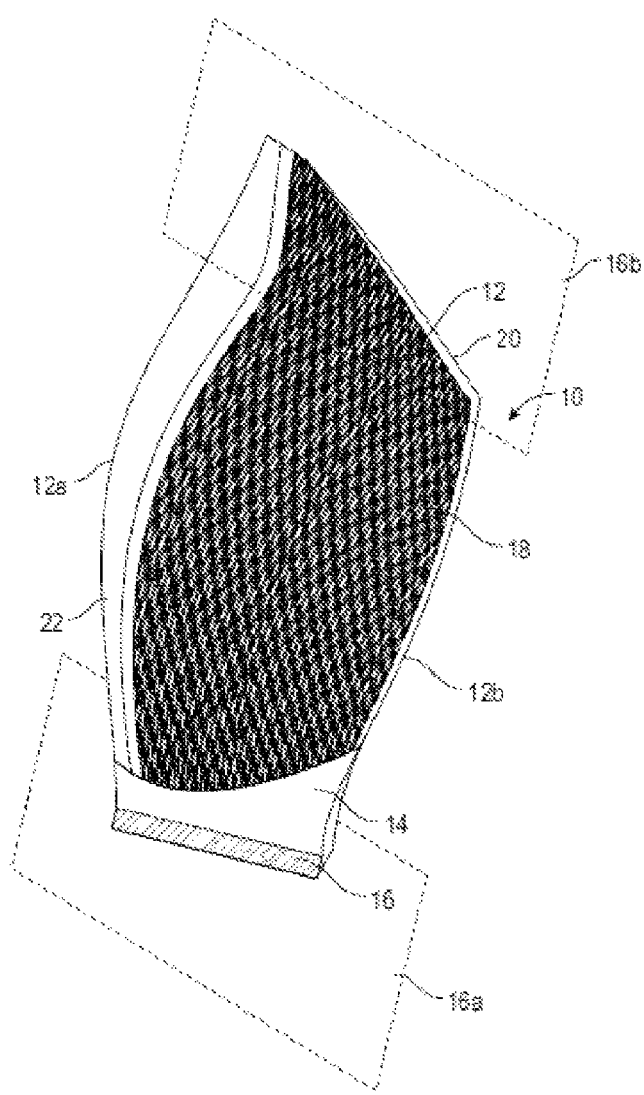

[Fig.2]
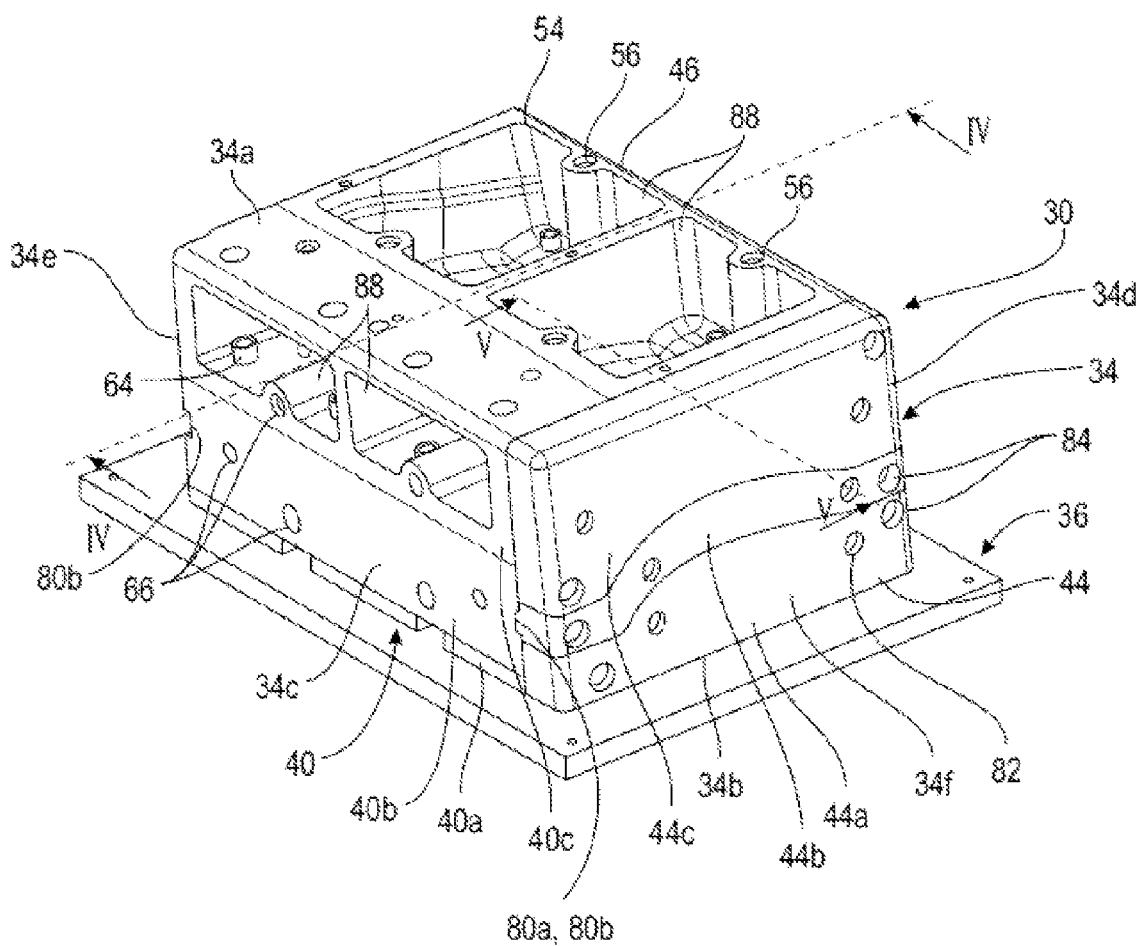

[Fig.3]
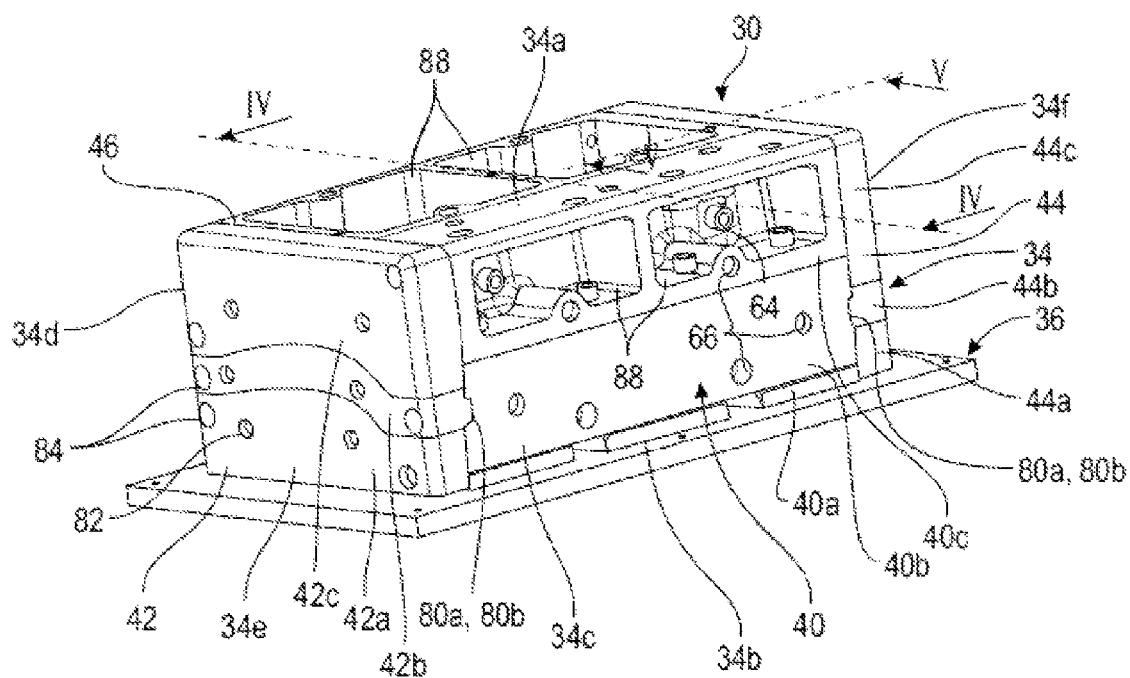

[Fig.4]
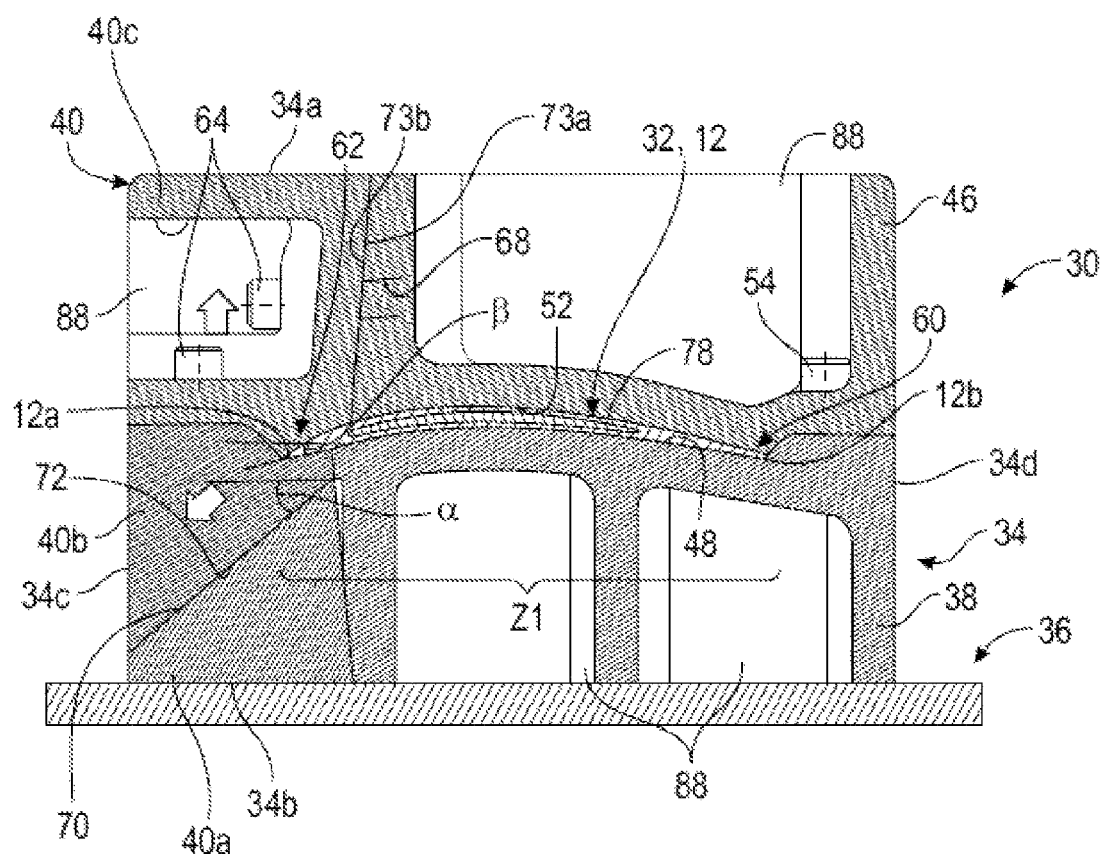

[Fig.5]
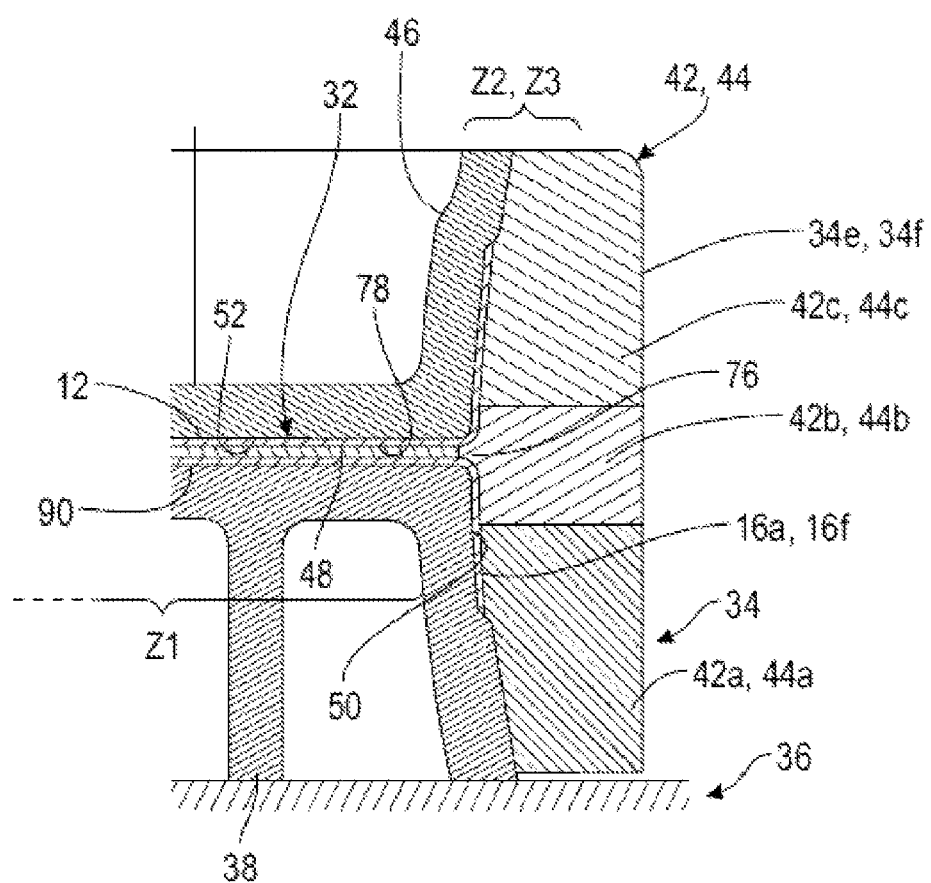

[Fig.6]
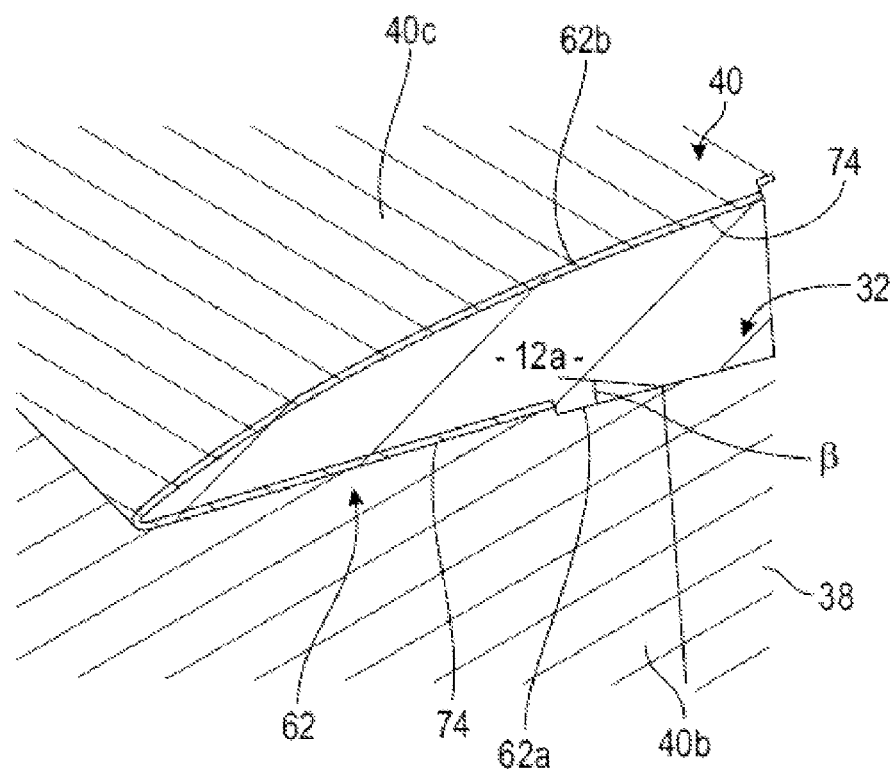

[Fig.7]
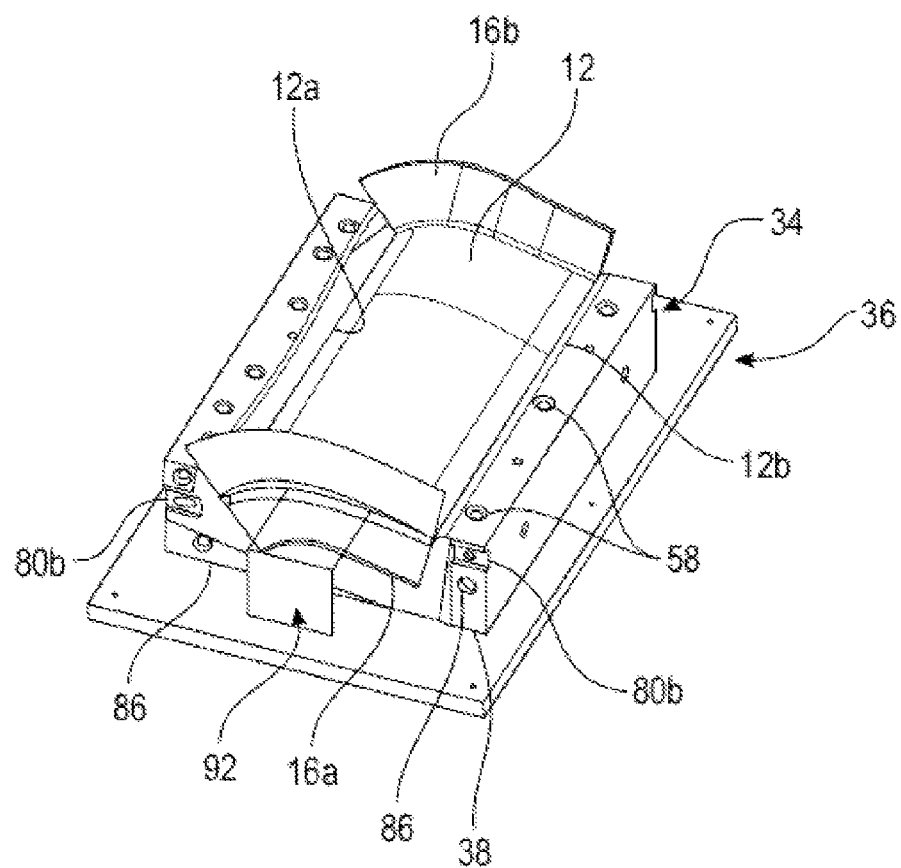

[Fig.8]
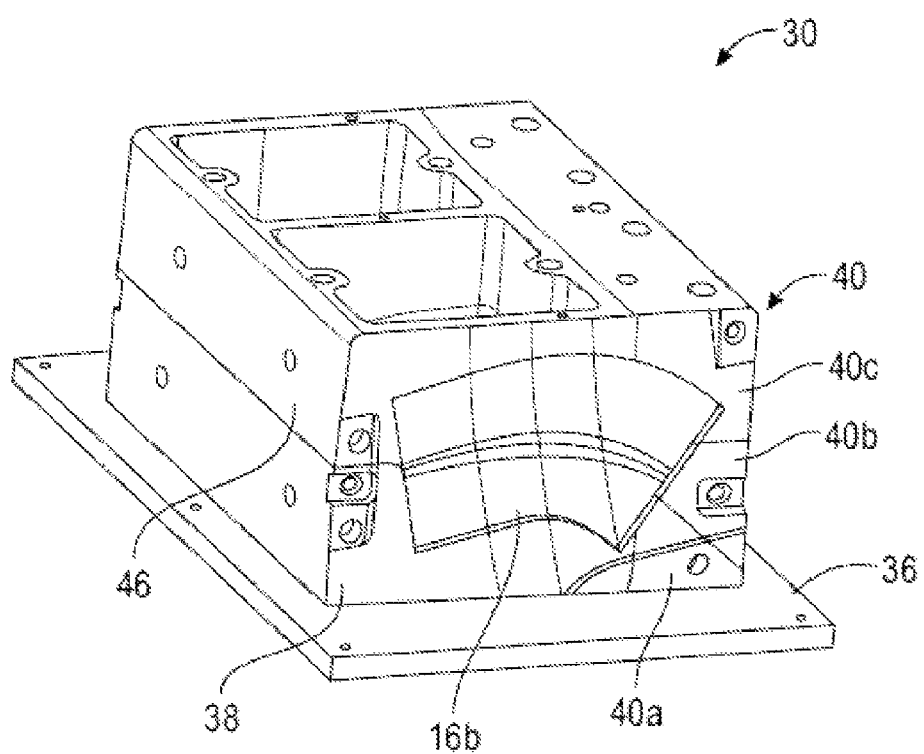

[Fig.9]
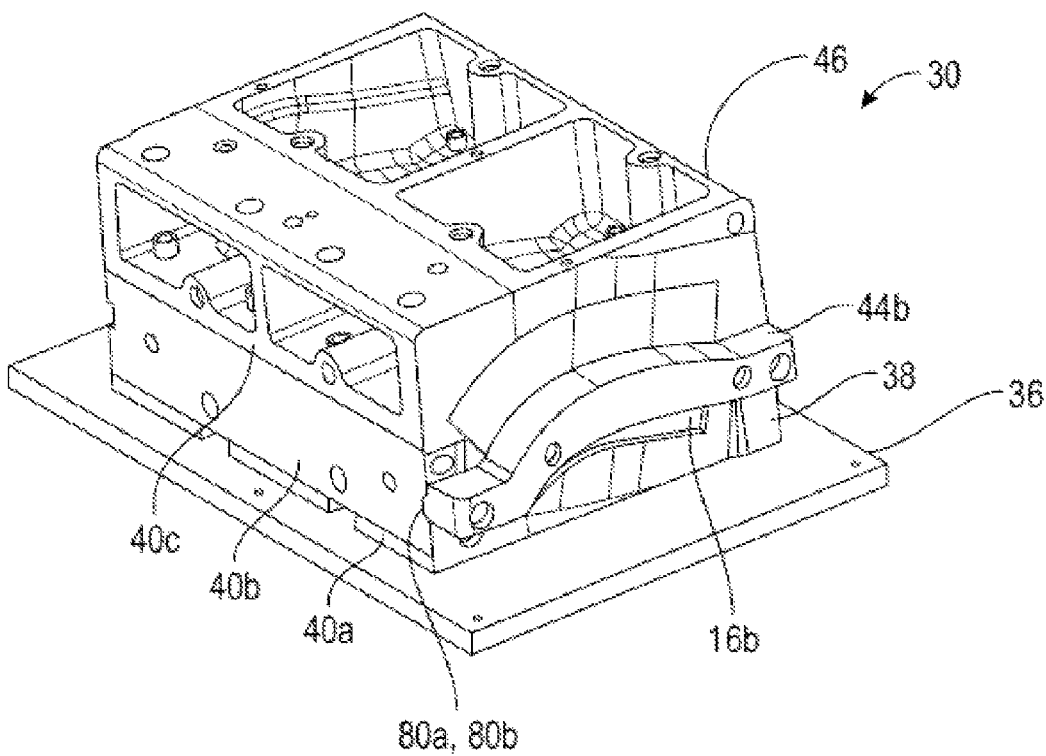

[Fig.10]
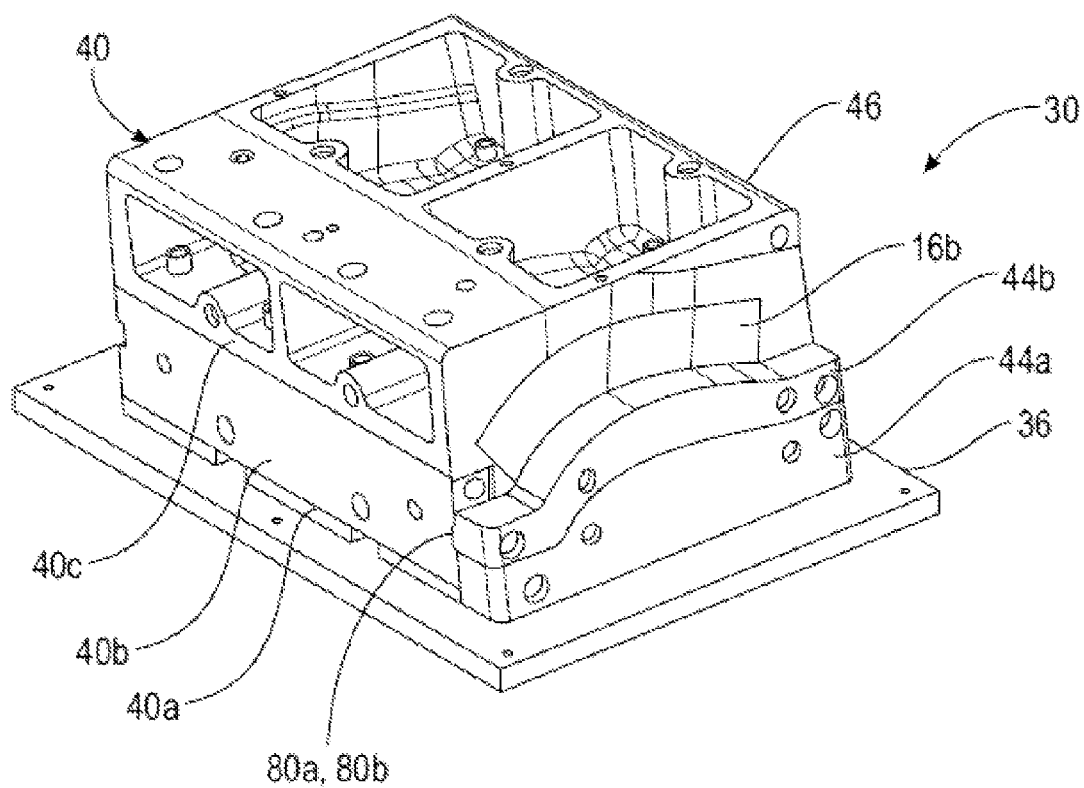

[Fig.11]
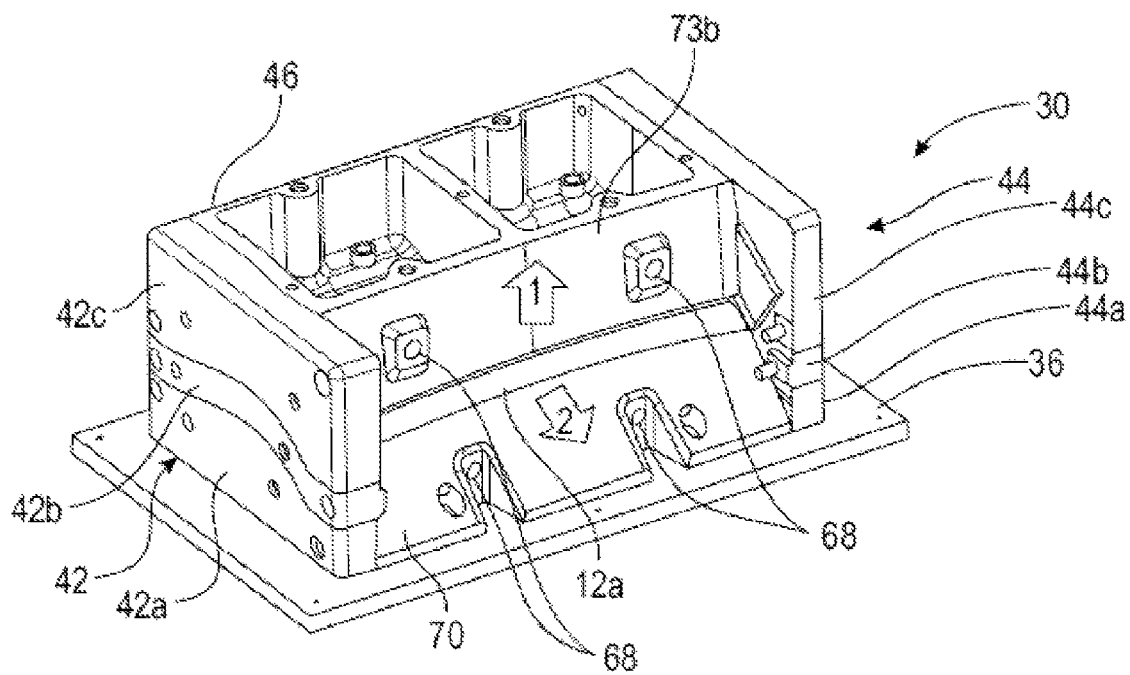

[Fig.12]
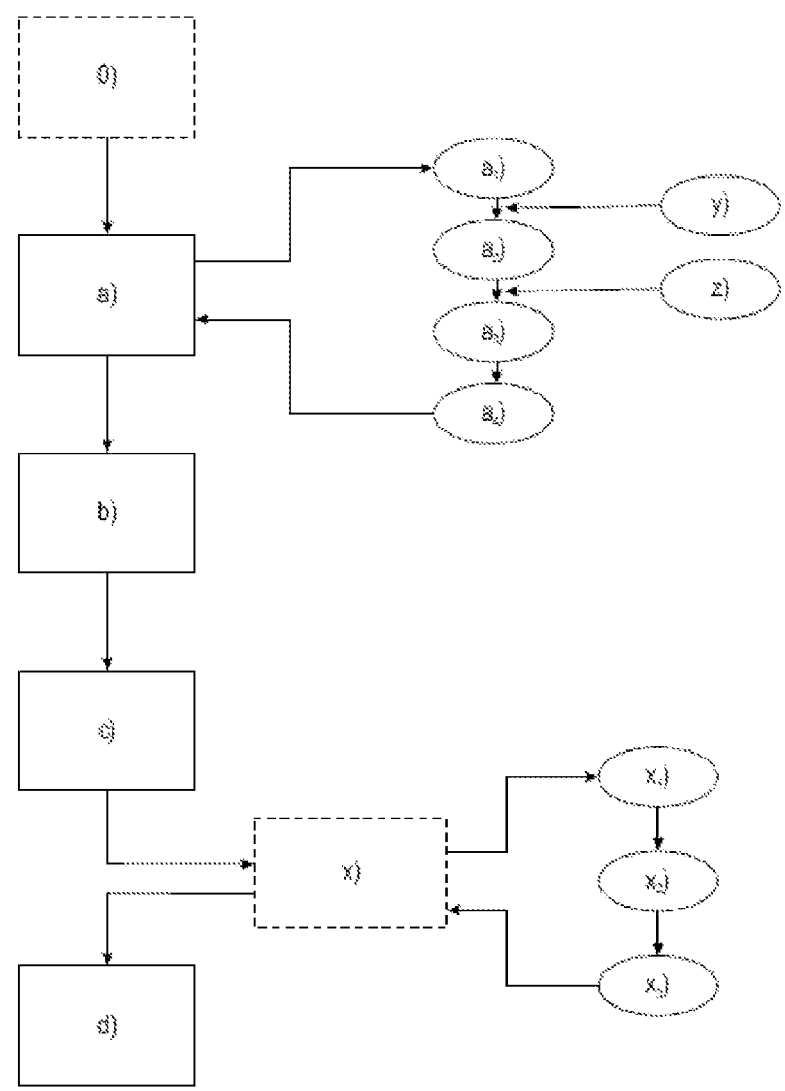

DEVICE FOR SHAPING A FIBROUS PREFORM FOR PRODUCING A BLADED PART OF A TURBOMACHINE

TECHNICAL FIELD OF THE INVENTION

The present invention relates to a device for shaping a fibrous preform for producing a bladed part of a turbomachine, as well as a method using this device.

TECHNICAL BACKGROUND

In particular, the state of the art comprises the documents FR-A1-2 940 057, FR-A1-3 014 008, FR-A1-3 029 134, FR-A1-3 032 147, FR-A1-3 046 404, FR-A1-3 051 348 and WO-A1-2014/076 348.

The use of composite materials is advantageous in the aeronautical industry in particular because these materials have interesting mechanical performances for relatively low masses.

A method for manufacturing a composite part for the aeronautical industry, which is well known to those skilled in the art, is the RTM (Resin Transfer Moulding) process.

It consists of a method for producing a part made of a composite material based on resin-impregnated fibres. For example, such a method is used to manufacture a bladed part of a turbomachine such as a fan vane or a rectifier blading.

An RTM process includes several successive steps.

We start with three-dimensional weaving to obtain a preform blank, and then the blank is cut in order to obtain a preform having substantially the shape of the bladed part to be obtained. This preform is then disposed within a mould, which is closed.

In the current technique, this mould has two functions or two successive uses. First, the mould is used to complete the shaping of the preform by hot-compression. Thus, it is pressed and stoved in order to compress the preform and stiffen it.

Afterwards, the mould is used to inject resin into the preform for impregnation thereof. The resin is injected through a feed port of the mould which is then stoved to cause polymerisation of the resin and curing thereof.

The bladed part is then removed from the mould and may undergo different successive operations, in particular finishing.

It is advantageous to use one single mould to carry out both shaping and resin injection steps. However, the drawback of this technology is that the mould cannot be especially adapted and optimised for either one of these steps since it has also to be suited to carry out the other step. It combines the constraints of both steps and is therefore more complex and more expensive.

In addition, this mould is not adapted to complete other functions such as the positioning and fixation of a metal shield on a leading edge of the bladed part.

The composite material of the bladed part is relatively fragile, and in particular sensitive to impact, and it is known to protect it by means of a metal shield which is attached and fastened on the leading edge of the bladed part.

The shield may be fastened to the blade in several ways. A first way consists in gluing the shield on the bladed part, after polymerisation of the resin.

A second way to fasten a shield on a bladed part consists in fastening the shield by co-moulding with the fibrous preform. The preform is disposed in the mould and the shield is positioned and even glued on the edge of the preform intended to form the leading edge of the blade. The injected resin impregnates the preform and comes into contact with the shield to ensure securing thereof to the blade after polymerisation and curing. A glue film may be interposed between the preform and the shield and is then intended to polymerise at the same time as the resin, which makes pairing easier and avoids the need for a thermal cycle on the end part.

The aforementioned mould of the current technique is not adapted for positioning the shield on the preform or fixation thereof The present invention provides a solution to these problems which consists in providing a device especially suited for the implementation of only one of the aforementioned functions, namely in this instance the shaping of the preform, and which is adapted to also achieve the pairing of the metal shield to the leading edge of the preform.

SUMMARY OF THE INVENTION

The invention relates to a device for shaping at least one fibrous preform for producing a bladed part of a turbomachine, this device including a mould formed by several parts that are interlocked with each other, this mould defining at least one internal cavity configured to receive the preform and to enclose said preform integrally, this cavity being intended to have two platform areas and a blade area extending between the two platform areas, characterised in that said mould comprises at least:
  a lower shell which forms a lower end of the mould and which comprises a convex curved surface of said blade area,
  an upper shell which forms an upper end of the mould and which comprises a concave curved surface of said blade portion, the upper and lower shells being fastened to each other, defining a first side of the mould and forming therebetween a first groove for forming a trailing edge of said blade area,
  a side shell which forms a second side of the mould, this second side being opposite to the first side and forming a second groove for forming a leading edge of said blade area, and
  end shells located at two opposite ends of the mould and between which the lower, upper and side shells extend, these end shells respectively forming at least one portion of said platform areas,
and in that each of the side and end shells comprises three elements, respectively lower, intermediate and upper, the elements of the side and end shells being independently and removably fastened so as to be able to be dismounted and removed from the mould without dismounting the upper and lower shells.

The device is especially designed and optimised to complete the shaping of the preform, this shaping being preferably achieved by the compression and heating of the preform in the mould. More advantageously, the device according to the invention is designed so as to enable the accurate positioning of the metal shield on the leading edge of the preform.

The different parts of the mould allow facilitating the assembly of the mould around the preform as well as the dismount of the mould, and in particular the partial dismount of the mould. Indeed, the elements of the end shells may be mounted and dismounted independently of the upper and lower shells. The elements of the side shell may also be independently mounted and dismounted, which allows having access to the leading edge of the preform for positioning the shield.

The convex curved surface of the lower shell is configured to be complementary with the concave side of the blade, called intrados. The concave curved surface of the upper shell is configured to be complementary with the convex side of the blade, called extrados.

The implementation device according to the invention may comprise one or more of the following features, considered separately, or in combination:
the three elements of said side shell comprise:
  a lower shell element which is located under said second groove and which comprises a first upper sliding surface,
  an intermediate shell element which is located on the lower shell element and which defines a lower portion of said second groove, this intermediate shell element including a second lower sliding surface which is configured to slidably cooperate with said first surface when dismounting the intermediate shell element, and
  an upper shell element which is located on the intermediate shell element and which defines an upper portion of said second groove;
the first and second surfaces are inclined at an angle α with respect to the horizontal, this angle α being larger than an angle β of inclination of said lower portion of the second groove, which is also measured with respect to the horizontal;
each of the lower portion of the second groove and the upper portion of the second groove defines a step for over-compacting the preform;
the three elements of each of said end shells comprise:
  a lower shell element which defines with the lower shell a lower portion of the corresponding platform area,
  an upper shell element which defines with the upper shell an upper portion of this platform area, and
  an intermediate shell element which is interposed between the lower and upper shell elements and which is configured to extend in continuation of the blade area;
the intermediate shell element of each of said end shells comprises a protruding rib configured to be engaged in an internal passage of the preform;
the intermediate shell element comprises indexing means configured to cooperate with complementary means of at least one of the lower, upper and side shells;
the shells and shell elements of the mould are fastened by screws which pass through orifices of these shells or shell elements and are screwed into threaded orifices of other shells or shell elements;
the mould has a parallelepipedal general shape and comprises, on at least some of its faces, recesses for lightening the mould.

The present invention also relates to a method for shaping at least one preform for producing a bladed part of a turbomachine, by means of a shaping device as described hereinabove, characterised in that it comprises the steps of:
  a) mounting a preform in the cavity of the mould, this preform including two platforms and a blade extending between the two platforms,
  b) closing the shaping device so as to compact the preform,
  c) stoving the shaping device in order to dry the preform, and
  d) dismounting the mould and removing the preform.
Advantageously, step a) comprises the sub-steps of:
  a1) mounting the preform on the lower shell of the mould, as well as on the lower and intermediate elements of the side shell,
  a2) mounting the upper shell and the upper shell element of the side shell on the preform,
  a3) mounting the intermediate shell elements of the end shells,
  a4) mounting the lower and upper shell elements of the end shells.

The method may comprise, prior to step a), a step 0) of inserting a mandrel, such as a foam block, into an internal passage of the preform, this internal passage extending within the blade and opening at the platforms.

The method may comprise, between the sub-steps a1) and a2), an additional sub-step y) of installing a member for positioning the mandrel (foam block) at each of the ends of the preform, and, between the sub-steps a2) and a3), a sub-step z) of removing these positioning members.

The method may comprise, between steps c) and d), a step x) of pairing a metal shield on the leading edge of the preform, this step comprising the sub-steps of:
  x1) dismounting and removing the upper shell element from the side shell,
  x2) dismounting and removing the intermediate shell element from the side shell, and
  x3) positioning the shield on the leading edge of the preform.

BRIEF DESCRIPTION OF THE FIGURES

Other features and advantages will appear from the following description of a non-limiting embodiment of the invention with reference to the appended drawings wherein:

FIG. 1 is a schematic perspective view of a bladed part of a turbomachine;

FIG. 2 is a schematic perspective view of a shaping device according to an embodiment of the invention;

FIG. 3 is another schematic perspective view of the device of FIG. 2;

FIG. 4 is a schematic sectional view according to the line IV-IV of FIGS. 2 and 3, and shows the preform located in the device;

FIG. 5 is a schematic partial sectional view according to the line V-V of FIGS. 2 and 3, and shows the preform located in the device;

FIG. 6 is an enlarged view of a portion of FIG. 4;

FIG. 7 is a schematic perspective view of a lower shell and of elements of a side shell of the mould of the device of FIG. 2, and in which a preform for a blade with integrated platforms is disposed;

FIG. 8 is a schematic perspective view of the set of FIG. 7 and on which the upper shell of the mould is attached;

FIG. 9 is a schematic perspective view of the set of FIG. 8 and on which intermediate elements of end shells of the mould are attached;

FIG. 10 is a schematic perspective view of the set of FIG. 9 and on which lower elements of end shells of the mould are attached;

FIG. 11 is a schematic perspective view of the set of FIG. 10 and on which upper elements of end shells of the mould are attached, the upper and intermediate elements of the side shell having moreover been removed; and FIG. 12 is a flowchart illustrating steps and sub-steps of a method according to the invention for shaping a preform.

DETAILED DESCRIPTION OF THE INVENTION

Referring first to FIG. 1 which illustrates a bladed part 10 made of a composite material for a turbomachine, this bladed part 10 consisting for example of a fan vane or a blading of a secondary flow rectifier in the case of a bypass turbojet engine.

The bladed part 10 comprises a blade 12. In the represented case where the part 10 is a fan vane, this blade 12 is linked by a shank 14 to a root 16 which has, for example, a dovetail shape and is shaped to fit into a recess with a complementary shape of a rotor disk, in order to retain the blade on this disk.

In the alternative case where the part 10 is a rectifier blading, the blade 12 extends between two platforms 16a, 16b which extend substantially parallel to each other and perpendicular to an axis of extension of the blade 14.

The blade 12 comprises a leading edge 12a and a trailing edge 12b of the gases that flow in the turbomachine. The blade 12 has a curved, or twisted, aerodynamic profile and comprises an intrados 18 and an extrados 20 extending between the leading 12a and trailing 12b edges.

The blade 12 is produced from a fibrous preform obtained by the three-dimensional weaving of fibres, for example carbon fibres.

The leading edge 12a of the blade is reinforced and protected by a metal shield 22 which is fastened on this leading edge 12a. For example, the shield 22 is made of a nickel and cobalt based alloy.

In the present invention, the proper positioning of the shield 22 on the preform is completed with a device 30 for shaping this preform, this shaping being preferably achieved by compression and heating.

An embodiment of the device 30 according to the invention is represented in FIGS. 2 to 11.

The device 30 is represented in its entirety in FIGS. 2 and 3. In the represented example, it has a parallelepipedal general shape.

FIGS. 4 and 5 represent sectional views of the device 30 and show that it comprises at least one internal cavity 32 configured to receive the fibrous preform of the or of each bladed part 10 to be produced.

In the represented example, this bladed part 10 is a rectifier blading. Hence, it is possible to notice that the cavity 32 essentially comprises three portions or areas, a blade area Z1 intended to receive the portion of the preform forming the blade 12 of the bladed part 10, and two platform areas Z2, Z3 intended to receive the portions of the preform forming the platforms 16a, 16b of the bladed part 10.

The device 30 essentially comprises a mould 34. In the represented example, this mould is shown on a planar support or a base 36, which is nonetheless optional.

The mould 34 has a parallelepipedal general shape and comprises an upper face 34a, a lower face 34b and four lateral faces 34c-34f. In this instance, the faces 34a-34f are rectangular. The mould 34 is set flat on the base 36 by bearing its lower face 34b on this base 36.

The lateral faces 34e, 34f are located on two opposite sides of the mould 34 and at the platform areas Z2, Z3 of the cavity 32 (cf. FIG. 5). The lateral faces 34c, 34d are located on two opposite sides of the mould 34 and respectively at the leading 12a and trailing 12b edges of the blade 12 (cf. FIG. 4).

The mould 34 is obtained by assembling several parts to facilitate mounting thereof around the preform and to also facilitate positioning and compaction of the preform while enabling access to the leading edge 12a of the preform to position the metal shield 22.

In this instance, the parts of the mould 34 are formed by shells or shell elements that are interlocked with each other in order to define the cavity 32. As shown in the drawings, the cavity 32 is completely delimited by the mould 34, which means that the mould 34 is configured to enclose the preform integrally.

In the represented non-limiting example, the mould 34 essentially comprises five shells, namely:
a lower shell 38,
a side shell 40,
two end shells 42, 44, and
an upper shell 46.

The lower shell 38 is shown in FIGS. 4 and 5 and mounted on the base 36 in FIG. 7. This shell 38 forms a portion of the lower end of the mould 34 and comprises a portion of the face 34b and a lower portion of the face 34d.

The lower shell 38 defines a lower portion of the cavity 32 and comprises an upper surface 48 having a convex curved shaped section (cf. FIG. 4) intended to be located on the intrados 18 side of the blade 12.

FIG. 5 shows that the surface 48 is linked at the platform areas Z2, Z3 of the cavity 32 to end surfaces 50 that are substantially parallel to each other and perpendicular to the surface 48. Thus, the lower shell 38 defines a lower portion of each of the platform areas Z2, Z3 of the cavity 32.

The upper shell 46 forms a portion of the upper end of the mould 34 and comprises a portion of the face 34a and an upper portion of the face 34d.

The shell 46 defines an upper portion of the cavity 32 and comprises a lower surface 52 having a concave curved shaped section (cf. FIG. 4) intended to be located on the extrados 20 side of the blade 12.

The upper 46 and lower 38 shells are fastened to each other for example by screws 54 which pass through orifices 56 of the upper shell and are screwed into threaded orifices 58 of the lower shell (cf. FIGS. 2, 4 and 7).

The upper 46 and lower 38 shells define a first side of the mould 34 and form therebetween a first groove 60 for forming the trailing edge 12b of the blade 12 (FIG. 4).

The side shell 40 is shown in FIGS. 2 to 4 in particular and forms a second side of the mould 34, namely that one which comprises the surface 34c located on the leading edge 12a side of the blade 12. The shell 40 forms a second groove 62 for forming the leading edge 12a of the blade (FIGS. 4 and 6).

The side shell 40 is fastened on the lower 38 and upper 46 shells by screws 64 which pass through orifices 66 of the side shell 40 and are screwed into threaded orifices 68 of the lower 38 and upper 46 shells (FIGS. 2 to 4 and 11).

As shown in FIG. 4 in particular, the side shell 40 comprises three elements, respectively lower 40a, intermediate 40b and upper 40c, which are independently and removably fastened so as to be able to be dismounted and removed from the mould 34 without dismounting the upper 46 and lower 38 shells.

The three elements of the side shell 40 comprise:
a lower shell element 40a which is located under the second groove 62 and which comprises a first upper sliding surface 70,
an intermediate shell element 40b which is located on the lower shell element 40a and which defines a lower portion (bearing the reference numeral 62a in FIG. 6) of the second groove 62, this intermediate shell element including a second lower sliding surface 72 which is configured to slidably cooperate with the first sliding surface 70 during a dismount of the intermediate shell element 40b, and
an upper shell element 40c which is located on the intermediate shell element 40b and which defines an upper portion (bearing the reference numeral 62b in FIG. 6) of the second groove 62. This shell element 40c includes a vertical or almost vertical surface 73a which is configured to slidably cooperate with a complementary surface 73b of the upper shell 46 during a dismount of the upper shell element 40c (FIG. 4).

As shown in FIGS. 4 and 6, the first and second surfaces 70, 72 are inclined at an angle α with respect to the horizontal. This angle α is larger than an angle β of inclination of the lower portion 62a of the second groove 62, which is also measured with respect to the horizontal.

FIG. 6, which is an enlarged view of the second groove 62, shows that each of the lower 62a and upper 62b portions of this second groove 62 defines a step 74 for over-compacting the preform. The step 74 allows defining an intended position of the shield to allow for a better pairing of the latter with the preform.

The end shells 42, 44 are intended to delimit the platform areas Z2, Z3 of the cavity 32 with the lower 38 and upper 46 shells (FIG. 5).

A first end shell 42 located to the left in FIG. 3 comprises the surface 34e and is formed by assembling three elements 42a, 42b, 42c. A second end shell 44 located to the right in FIG. 3 comprises the surface 34f and is formed by assembling three elements 44a, 44b, 44c.

The three elements of each of the end shells 42, 44 comprise (FIG. 5):

a lower shell element 42a, 44a which defines with the lower shell 38 a lower portion of the corresponding platform area Z2, Z3, an upper shell element 42c, 44c which defines with the upper shell 38 an upper portion of this platform area Z2, Z3, and an intermediate shell element 42b, 44b which is interposed between the lower 42a, 44a and upper 42c, 44c shell elements and which is configured to extend in continuation of the blade area Z1.

The intermediate shell element 42b, 44b of each of the end shells 42, 44 comprises a protruding rib 76 configured to be engaged in an internal passage 78 of the preform.

This intermediate shell element 42b, 44b may comprise indexing means 80a configured to cooperate with complementary means 80b of at least one of the lower 38, upper 46 and side 40 shells, as shown in FIGS. 2 and 3. For example, these indexing and complementary means 80a, 80b cooperate by male-female nesting or fitting, and comprise for example fingers carried by the shell element 42b, 44b and notches formed on the lower shell 38.

Each intermediate shell element 42b, 44b comprises upper and lower ends shaped so as to fittedly nest into the corresponding ends of the upper 42c, 44c and lower 42a, 44a shell elements, respectively. These ends may further be shaped so as to ensure foolproofing during mounting and avoid mounting one of the elements instead of another.

The shell elements of each end shell 42, 44 are fastened by screws 82 that pass through orifices 84 of these shell elements and are screwed into threaded orifices 86 of other shells or shell elements.

The figures show that at least some faces 34a, 34c of the mould 34 have recesses 88 for lightening the mould. This is the case in particular, in the represented example, of the upper shell 46 which comprises recesses 88 on the upper face 34a (cf. FIGS. 2 and 3), of the upper shell element 40c of the side shell 40 which also comprises recesses 88 on the lateral face 34c, and of the lower shell 38 which comprises recesses 88 on the lower face 34b (cf. FIG. 4).

The present invention also relates to a method for shaping a preform to produces a bladed part of a turbomachine, by means of the device 30.

This method will now be described with reference to the drawings and is illustrated by the flowchart of FIG. 12.

The method essentially comprises 4 steps, namely the steps of:

a) mounting a preform in the cavity 32 of the mould 34, this preform including two platforms 16a, 16b and a blade 12 extending between the two platforms, b) closing the device 30 so as to compact the preform, c) stoving the device 30 in order to dry the preform, and d) dismounting the mould 34 and removing the preform.

Prior to or during step a), the method may comprise a step 0) of inserting a mandrel, such as a foam block 90, into the internal passage 78 of the preform, this internal passage 78 extending inside the blade and opening at the platforms 16a, 16b.

Indeed, during the formation of the preform by the three-dimensional weaving of yarns, for example, carbon yarns, a debonding is performed at the centre of the blade and over the entirety of the longitudinal dimension of the blade, so as to create this passage 78 which is shown in section in FIG. 4. This passage 78 crosses the entire length of the blade 12 to open at the platforms 16a, 16b, as shown in FIG. 5. The mandrel (foam block 90) is inserted into this passage 78 and has to be properly positioned inside the passage 78.

Step a) of the method is illustrated in FIGS. 7 to 10 in particular.

Advantageously, step a) comprises the sub-steps of:

a1) mounting the preform on the lower shell 38 of the mould 34, as well as on the lower 40a and intermediate 40b elements of the side shell 40 (cf. FIG. 7); the blade 12 of the preform is then positioned on the surface 48 of the lower shell 38 and its leading edge 12a is positioned on the lower portion 62a of the groove 62 (cf. FIG. 6); the platforms are, in turn, partially applied on the surface 50 of the lower shell 38 (FIG. 5); this positioning may be accurately completed by projection of a laser beam on the preform and the mould and alignment of tracers (for example glass fibres) or markers of the preform and of the mould 40 with this projection, a2) mounting the upper shell 46 on the preform and the lower shell 38, and mounting the upper shell element 40c of the side shell 40 on the intermediate shell element 40b (cf. FIG. 8), a3) mounting the intermediate shell elements 42b, 44b of the end shells 42, 44; this enables the aforementioned ribs 76 to be engaged in the ends of the passage 78 of the blade and to bear on the ends of the mandrel (foam block 90) in order to properly locate it in the passage; this further allows ensuring a perfect forming of the rays of the blade of the preform without buckling upon compression and drying; indeed, the rays are the critical areas of the part and buckling would induce a considerable reduction in the mechanical properties; the proper positioning by indexing the shell elements 42b, 44b is ensured by cooperation of the aforementioned means 80a, 80b, a4) mounting the lower 42a, 44a and upper 42c, 44c shell elements of the end shells 42, 44 (cf. FIG. 10 and then FIGS. 2 and 3).

Between the sub-steps a1) and a2), the method may comprise an additional sub-step y) of installing a member for positioning 92 the mandrel (foam block 90) at each of the ends of the preform. One of these members 92 is shown in FIG. 7 and may be set our mounted on the base 36. These members 92 serve in holding the mandrel (foam block 90) in position before mounting and fastening the upper shell 46. After fastening this upper shell 46, the blade 12 is fixedly held between the lower 38 and upper 46 shells and the mandrel (foam block 90) can no longer move within the passage 78. The members 92 are then no longer necessary and the method then comprises, between the sub-steps a2) and a3), a sub-step z) of removing these positioning members.

The device 30 is closed at step b) in order to clamp the shells of the mould 34 against each other, and compact the preform. The set is stoved at step c) to dry the preform and fix the shape predetermined by shaping and compaction.

The method may further comprise, between steps c) and d), a step x) of pairing the metal shield 22 on the leading edge 12a of the preform.

This step x) is illustrated in FIGS. 4 and 11 and comprises the sub-steps of:
  x1) dismounting and removing the upper shell element 40c from the side shell 40; this displacement is schematically represented by the arrow 1 and is carried out from the bottom to the top; during this displacement, the surfaces 73a, 73b can slip on one another; this sub-step x1) allows releasing the leading edge 12a on the extrados side of the blade,
  x2) dismounting and removing the intermediate shell element 40b from the side shell 40; this displacement is schematically represented by the arrow 2 and is carried out in a direction parallel to the surfaces 70, 72 because these surfaces serve as a guide; the fact that the angle α is larger than the angle β enables the shell element 40b to be removed without any risk of touching and deforming the leading edge and the preform; this sub-step x2) allows releasing the leading edge 12a on the intrados side of the blade; the leading edge 12a is therefore totally free, and
  x3) positioning the shield 22 on the leading edge 12a of the preform.

The positioning of the shield 22 may then be completed by laser projection of its contour on the preform. This has the advantage of positioning the shield in the reference frame of the device 30 and therefore ensuring a proper positioning in contrast with the case where this has been done with respect to the preform (for example with respect to tracers). During this operation, the preform (which has been wedged in the mould reference frame) is held by the rest of the mould and cannot move.

The over-compaction mentioned in the foregoing with reference to FIG. 6 allows facilitating mounting the shield 22 on the leading edge 12a. This over-compaction may be determined so that the crushing and the generated additional reduction of thickness compensate for the thickness of the shield 22, the elastic return of the preform (during the dismount of the shells), possibly the thickness of the glue film and enough clearance to enable the insertion of the shield. In the case where the shield 22 would be immobilised on the leading edge 12a by glue, this thickness reduction may also compensate for the thickness of the glue film or for the variation of the thickness of this film.

At step x), the blade 12 and the leading edge 12a may have a horizontal general orientation, as shown in the drawings. Alternatively, the blade 12 and the leading edge may be directed substantially vertically to facilitate mounting the shield 22 on the leading edge.

At a next step, the dried and stiffened preform may be transferred into another mould for injecting resin into the preform and stiffening the bladed part 10.

The device according to the invention is advantageous to the extent that it is adapted and optimised for shaping the preform and pairing the shield. As example, it does not necessarily comprise sealing means such as gaskets in contrast with a resin injection mould. Moreover, it may be made of a light or good heat-conductive material (to optimise the heating cycle), such as aluminium, so as to facilitate handling thereof.

Although this is not represented, the device according to the invention may be used for the simultaneous manufacture of several bladed parts and may comprise a cavity for receiving several preforms or several distinct cavities for receiving these preforms.

The invention claimed is:

1. A device for shaping at least one fibrous preform for producing a bladed part of a turbomachine, this device including a mould formed by several parts that are interlocked with each other, this mould defining at least one internal cavity configured to receive the preform and to enclose said preform integrally, this cavity being intended to have two platform areas and a blade area extending between the two platform areas,
  wherein said mould comprises at least:
  a lower shell which forms a lower end of the mould and which comprises a convex curved surface of said blade area,
  an upper shell which forms an upper end of the mould and which comprises a concave curved surface of said blade portion, the upper and lower shells being fastened to each other, defining a first side of the mould and forming therebetween a first groove for forming a trailing edge of said blade area,
  a side shell which forms a second side of the mould, this second side being opposite to the first side and forming a second groove for forming a leading edge of said blade area, and
  end shells located at two opposite ends of the mould and between which the lower, upper and side shells extend, these end shells respectively forming at least one portion of said platform areas,
  and in that each of the side and end shells comprises three elements, respectively lower, intermediate and upper, the elements of the side and end shells being independently and removably fastened so as to be able to be dismounted and removed from the mould without dismounting the upper and lower shells.

2. The shaping device according to claim 1, wherein the three elements of said side shell comprise:
  a lower shell element which is located under said second groove and which comprises a first upper sliding surface,
  an intermediate shell element which is located on the lower shell element and which defines a lower portion of said second groove, this intermediate shell element including a second lower sliding surface which is configured to slidably cooperate with said first surface when dismounting the intermediate shell element, and
  an upper shell element which is located on the intermediate shell element and which defines an upper portion of said second groove.

3. The shaping device according to claim 2, wherein the first and second surfaces are inclined at an angle α with respect to the horizontal, this angle α being larger than an angle β of inclination of said lower portion of the second groove, which is also measured with respect to the horizontal.

4. The shaping device according to claim 2, wherein each of the lower portion of the second groove and the upper portion of the second groove defines a step for over-compacting the preform.

5. The shaping device according to claim 1, wherein the three elements of each of said end shells comprise:
- a lower shell element which defines with the lower shell a lower portion of the corresponding platform area,
- an upper shell element which defines with the upper shell an upper portion of this platform area, and
- an intermediate shell element which is interposed between the lower and upper shell elements and which is configured to extend in continuation of the blade area.

6. The shaping device according to claim 1, wherein the intermediate shell element of each of said end shells comprises a protruding rib configured to be engaged in an internal passage of the preform.

7. The shaping device according to claim 1, wherein the intermediate shell element comprises indexing means (80a) configured to cooperate with complementary means of at least one of the lower, upper and side shells.

8. The shaping device according to claim 1, wherein the shells and shell elements of the mould are fastened by screws which pass through orifices (56, 66, 84) of these shells or shell elements and are screwed into threaded orifices (58, 68, 86) of other shells or shell elements.

9. The shaping device according to claim 1, wherein the mould has a parallelepipedal general shape and comprises, on at least some of its faces, recesses for lightening the mould.

10. A method for shaping at least one preform for producing a bladed part of a turbomachine, by means of a shaping device according to claim 1, wherein the method comprises the steps of:
- a) mounting a preform in the cavity of the mould, this preform including two platforms and a blade extending between the two platforms,
- b) closing the shaping device so as to compact the preform,
- c) stoving the shaping device in order to dry the preform, and
- d) dismounting the mould and removing the preform.

11. The method according to claim 10, wherein step a) comprises the sub-steps of:
- a1) mounting the preform on the lower shell of the mould, as well as on the lower and intermediate elements of the side shell,
- a2) mounting the upper shell and the upper shell element of the side shell on the preform,
- a3) mounting the intermediate shell elements of the end shells,
- a4) mounting the lower and upper shell elements of the end shells.

12. The method according to claim 10, wherein it comprises, prior to step a), a step 0) of inserting mandrel into an internal passage of the preform, this internal passage extending within the blade and opening at the platforms.

13. The method according to claim 12, wherein it comprises, between the sub-steps a1) and a2), an additional sub-step y) of installing a member for positioning the mandrel at each of the ends of the preform, and, between the sub-steps a2) and a3), a sub-step z) of removing these positioning members.

14. The method according to claim 10, wherein it comprises, between steps c) and d), a step x) of pairing a metal shield on the leading edge of the preform, this step comprising the sub-steps of:
- x1) dismounting and removing the upper shell element from the side shell,
- x2) dismounting and removing the intermediate shell element from the side shell, and
- x3) positioning the shield on the leading edge of the preform.

* * * * *